United States Patent
Theus et al.

[11] Patent Number: 5,844,427
[45] Date of Patent: Dec. 1, 1998

[54] MONOLITHIC INTEGRATED SENSOR CIRCUIT

[75] Inventors: Ulrich Theus, Gundelfingen; Mario Motz, Endingen, both of Germany

[73] Assignee: Deutsche ITT Industries GmbH, Freiburg, Germany

[21] Appl. No.: 806,905

[22] Filed: Feb. 26, 1997

[30] Foreign Application Priority Data

Mar. 2, 1996 [EP] European Pat. Off. .............. 96103238

[51] Int. Cl.$^6$ .................................. G01R 33/06
[52] U.S. Cl. .............................. 327/51; 327/511; 324/251
[58] Field of Search ................................. 327/51, 52, 54, 327/67, 84, 89, 92, 72, 73, 423, 511, 244–247; 324/251, 117 H, 207.2; 338/32 H

[56] References Cited

U.S. PATENT DOCUMENTS

| | | | |
|---|---|---|---|
| 4,992,731 | 2/1991 | Lorenzen | 324/174 |
| 5,084,674 | 1/1992 | Lachmann et al. | 324/174 |
| 5,278,462 | 1/1994 | Wilson | 327/79 |
| 5,640,090 | 6/1997 | Furuya et al. | 324/251 |
| 5,668,331 | 9/1997 | Schintag et al. | 73/865.9 |

FOREIGN PATENT DOCUMENTS

| | | |
|---|---|---|
| 0115391 | 8/1984 | European Pat. Off. . |
| 0536667A1 | 4/1993 | European Pat. Off. . |
| 0548391A1 | 6/1993 | European Pat. Off. . |
| WO 92/22093 | 10/1992 | WIPO . |

OTHER PUBLICATIONS

European Search Report for 96103238.0 dated Aug. 2, 1996.

*Primary Examiner*—My-Trang Nu Ton
*Attorney, Agent, or Firm*—Plevy & Associates

[57] ABSTRACT

A monolithic integrated sensor circuit is disclosed comprising a sensor system for generating an electronic sensor signal; a supply unit for the sensor system; an amplifying stage for amplifying the sensor signal; a plurality of inverting devices in the signal path of the amplifying stage which reverse the polarity of the sensor signal at equal time intervals, the time intervals and inversion of the sensor signal being controlled by a clock signal source; and an averaging combiner stage whose input receives an amplified sensor signal and whose output has a reference polarity which is controlled by means of the inverting devices in such a way as to be always the same regardless of the switching state in the signal path. The monolithic integrated sensor circuit of the present invention minimizes the offset error.

20 Claims, 1 Drawing Sheet

MONOLITHIC INTEGRATED SENSOR CIRCUIT

FIELD OF THE INVENTION

The present invention relates to a monolithic integrated sensor circuit for converting an applied physical input quantity to an electronic sensor signal. The circuit of the present invention comprises a sensor system for generating an electronic sensor signal; a supply unit for the sensor system; an amplifying stage for amplifying the sensor signal; a plurality of inverting devices that reverse the polarity of the sensor signal; and an averaging combiner stage whose input receives an amplified sensor signal and whose output has a reference polarity controlled by the plurality of inverting devices.

BACKGROUND OF THE INVENTION

Monolithic integrated sensor systems are well known. Such systems are useful for measuring pressure, acceleration, temperature, current, magnetic fields, or other such physical quantities and variables. The monolithic integrated sensor systems measure such variables by converting an applied physical input quantity to an electronic sensor signal. For accuracy of measurement, it is desirable that the value and polarity of the sensor signal be linked as closely as possible with the physical quantity to be measured.

During monolithic integration, however, error sources caused by manufacturing tolerances and temperature effects is frequently possible. Monolithic integrated sensor systems may be sensitive to variables such as temperature and humidity, thus affecting the accuracy of the measurement. To avoid error, use is made of the fact that absolute tolerances during monolithic integration are large, but relative tolerances are very small. By appropriate matching or symmetrical design of the circuit, large absolute tolerances can be avoided, so that only the small relative tolerances will have an effect on the signal. Furthermore, the individual stages in integrated circuits are, as a rule, not adjustable. To remedy this, complicated and costly control circuits can be incorporated on the chip which eliminate the need for adjusting the individual stages of the circuits.

Besides the non-linearity of the individual sensor systems, the offset errors of the sensor circuit are particularly disturbing. These errors, which are difficult to eliminate, are generally DC voltage offset errors, which lead to distortions if their magnitude is no longer negligible in relation to the electronic signal output from the respective sensor. As a rule, the sensor already delivers an offset-containing signal, and additional offset errors are caused in the individual stages of the subsequent amplifier. In the worst case, all offset errors combine. The sensitivity and accuracy of the overall sensor circuit is thus limited by the possible sum of all offset errors, which defines a worst-case, maximum offset error.

Additionally, in utilizing a monolithic integrated sensor circuit to measure physical quantities, it is desirable for the circuit to provide at the output of the combiner stage a continuous signal without interruptions. This is important if the sensor system is to measure physical quantities which have very low frequency components or even DC components. If field-effect transistors are used in the evaluating circuit, these low frequency ranges are frequently superimposed with flicker noise. This flicker noise has the same adverse effect as offset error.

It is, therefore, an object of the invention to provide a monolithic integrated sensor circuit whose total offset error is minimized. Also, it is an object of the invention to provide a sensor circuit which suppresses flicker noise for measuring physical quantities which have low frequency components or even DC components.

SUMMARY OF THE INVENTION

According to the invention, a monolithic integrated sensor circuit is provided, comprising a sensor system for generating an electronic sensor signal; a supply unit for the sensor system; an amplifying stage for amplifying the sensor signal; and a plurality of switches or inverting devices in the signal path of the amplifying stage which reverse the polarity of the sensor signal at equal time intervals as determined by a clock signal source. The amplifying stage comprises an input amplifier and an integrator or averaging combiner stage whose input receives an amplified sensor signal and whose output has a reference polarity which is controlled by the inverting devices. The inverting devices control the polarity of the sensor signal in such a way as to be always the same regardless of the switching state in the signal path. The supply unit provides a reference polarity for biasing the system.

One advantage of the invention is that the switches or inverting devices periodically invert the signal such that the offset error of the individual amplifier stages is averaged out. Further objects, features, and advantages of the present invention will become more apparent to those skilled in the art as the nature of the invention is better understood from the accompanying drawings and detailed description. For example, the sensor circuit according to the invention requires only little external wiring for possible auxiliary functions, i.e., for changing the frequency of the clock signal source.

BRIEF DESCRIPTION OF THE DRAWINGS

There is shown in the accompanying drawings a diagram of the invention which is presently preferred, it being understood, however, that this invention is not limited to the precise circuit shown. To illustrate the invention, a preferred embodiment is described below, considered together with the accompanying drawings, in which.

DETAILED DESCRIPTION OF THE INVENTION

Figures 1, 1A:
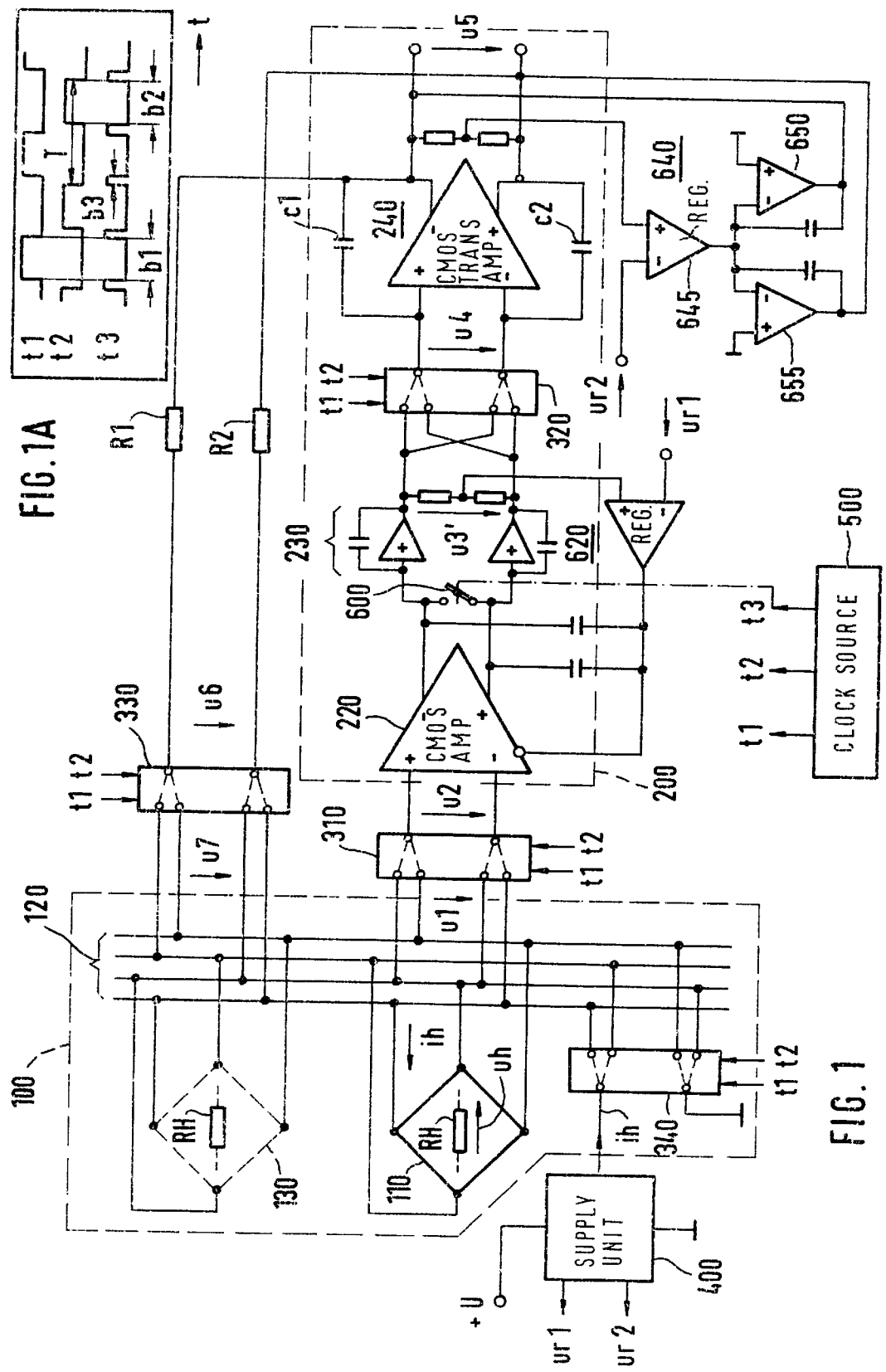
FIG. 1 is a schematic block diagram of a preferred embodiment for the present invention monolithic integrated sensor circuit.
FIG. 1A is an exploded schematic diagram depicting the intervals of the clock signal source of the present invention.

Referring to FIG. 1, there is shown a monolithic integrated sensor circuit with a sensor system in the form of a switchable Hall sensor system. This sensor system may, of course, be replaced by a pressure, temperature, radiation, or other such sensor system. This does not alter the basic operation of the circuit.

Referring to FIG. 1, the sensor system 100 provides an output with a differential voltage u1, which is amplified by an amplifying stage 200 and outputted as a differential output signal u5. The amplifying stage 200 comprises two separate amplifiers: the input amplifier 220 and the output stage amplifier 240. The amplifiers 220 and 240 are operational or differential amplifiers. The signal amplifier proper is the input amplifier 220. The output stage amplifier 240 has only little gain and exhibits low-pass characteristics, because capacitive feedback is provided through two capacitors c1, c2. According to the invention, the output stage amplifier 240 also performs the function of an integrator or averaging combiner stage and is so referred to herein; it provides dynamic compensation for the feedback amplifier 200 and prevents unstable operation or even hunting as with parasitic oscillations.

The output signal u5 of the amplifying stage 200 is fed back through a first feedback resistor R1 and a second feedback resistor R2. The feedback resistors R1 and R2 are in turn coupled via electronic switches or inverting devices 330, 310 to the two inputs of the input amplifier 220. The input resistance of the amplifying stage 200 is formed by an equivalent resistance RH which corresponds to the resistance of all Hall plates 130, 110, connected between the sensor measuring outputs. This equivalent resistance RH is connected between the inverting and non-inverting inputs of the input amplifier 220. The overall gain of the amplifying stage 200 is thus 2×R1/RH, with R1=R2.

The respective sensor system 100 and the remainder of the circuit are fed from a supply unit 400. The supply unit 400 makes available the necessary currents and, if needed, auxiliary voltages, with a predetermined temperature dependence, for the entire circuit. The supply unit is coupled to the remaining circuitry and generates the reference voltage for biasing the system. If necessary, the supply unit 400 also generates a regulated supply voltage from the applied voltage +U. The supply unit 400 is technologically closely linked with the Hall plates 110, 130 so as to obtain a good thermal match and compensate for manufacturing tolerances. For example, the supply unit could be disposed on the same circuit board or in close proximity to the Hall plates so that they experience the same environmental characteristics or are influenced by the same processes.

The circuit further includes a clock signal source 500, which generates a first switching clock t1 and a non-overlapping second switching clock t2 whose intervals b1, b2 are of the same length, as illustrated in FIG. 1A. The clock frequency is preferably about 100 kHz, for example, so that the period T is about 10 microseconds. The clock signal source 500 may also deliver a third clock signal t3 which corresponds to the non-overlapping portions b3, which are approximately 20 nanoseconds long. (See, for example, FIG. 1A.)

The amplifying stage is advantageously designed as a feedback operational amplifier arrangement. In the Hall sensor system, the internal resistance of the Hall plates connected to the amplifying stage forms the input resistance. The feedback resistors R1 and R2 are fabricated with the same semiconductor material as the Hall plates 110, 130, to permit a good match with respect to manufacturing tolerances and temperature. For the individual amplifiers, including naturally the averaging combiner stage 240, transconductance amplifiers are especially suited. These are easy to stabilize and easy to implement in CMOS (complementary metal oxide semiconductor) technology. Transconductance amplifiers using CMOS technology are well known. The averaging combiner stage 240 can be implemented, for example, with a transconductance amplifier with capacitive feedback, in which case the resulting time constant should be greater than one or more periods of the switching clock, but at least as great as the non-overlapping portion b3. The inputs of the transconductance amplifier are free from direct current, since they are formed by gate terminals of field-effect transistors. As a result, the integrated capacitors can readily implement the necessary signal storage and keep the voltage constant for averaging.

Coupled to the amplifying stage 200 are a first regulating circuit 620 and a second regulating circuit 640. The regulating circuits 620, 640 maintain the operating points of the input amplifier 220 and the output stage 240 at predetermined voltage values ur1 and ur2, respectively.

At essential interfaces, the signal path of the amplifying stage 200 contains inverting devices. Referring to FIG. 1, four inverting devices 310, 320, 330, 340 are shown. It is understood, however, that a different array of inverting devices may be used according to the invention. For example, under certain circumstances, i.e., if the current direction in the sensors is changed by 180 degrees, this eliminates the need for the first inverting device, as will be further explained below.

Each of the inverting devices 310, 320, 330 and 340 are controlled by first and second switching clocks t1, t2 from the clock signal source. Because of the symmetrical design of the signal path, one of the switching clocks t1, t2 causes the signal path to be switched through directly, while the other respective switching clock t2, t1 causes cross-switching of the signal path. Inversion of the signal path is thus a function of time and the operative mode of the inverting devices as controlled by the clock signal source.

During the short non-overlapping time b3, the signal path is open so that no signal interaction will occur. To prevent any spurious external signals from inadvertently passing through (being "caught by"), the purportedly open interfaces during the interval b3, a short-circuiting switch 600 is inserted between the input amplifier 220 and the averaging combiner stage 240. The switch 600 is an electronic switch which is turned "on" by the b3 pulse and thus acts as a short circuit; it short-circuits the symmetrical path during this critical interval b3. The effect of the short pulse on the output signal u5 is small, because the time interval b3 is short compared to the clock period T (shown in FIG. 1A), and because the short circuit ties the two signal lines to the neutral mid-level. More sophisticated buffers which further reduce the sudden voltage change during the interval b3 are contemplated as well.

The first inverting device 310 is located directly between the sensor system 100 and the input amplifier 220. The sensor signal u1 is fed to the first inverting device 310 which either inverts or does not invert the signal, depending on the operative mode of the device as controlled by the switching clocks, i.e., either t1, t2, or t2, t1. The signal output from the inverting device is a differential signal u2, which is then applied to the input amplifier 220. The input amplifier 220, in turn, produces a differential output signal u3 which is fed to a symmetrical, capacitively bypassed impedance transformation stage 230. At the outputs of the transformation stage 230, the first regulating circuit 620 regulates the operating point of the input amplifier 220; the outputs of the transformation stage 230 are connected to a voltage divider whose center-tap voltage is applied to the first regulating circuit 620. The inverting input of the amplifier 620 is coupled to the ur1 voltage reference generated from the supply unit 400.

The output signal u3' of the impedance transformation stage 230 is fed to a second switch or inverting device 320, whose output signal u4 is applied as a differential signal to the input of the averaging or integration combiner stage 240. The output of the combiner stage 240 provides the desired output signal u5. The output terminals of the averaging combiner stage 240 are connected to a voltage divider whose center-tap voltage is applied to the second regulating circuit 640. The second regulating circuit holds the operating point of the output signal u5 at the voltage value ur2, preferably at 2.5 V in a circuit implemented in CMOS technology.

Regarding the configuration of the second regulating circuit 640, it contains in its input a differential amplifier 645. The inverting input of the differential amplifier 645 is coupled to the ur2 voltage reference from supply unit 400. The output of the differential amplifier 645 drives two current sources 650, 655, whose output currents are connected to the output terminals of the combining stage 240, the two regulation currents being superimposed on the output currents of the transconductance amplifier 240. Through the current superposition, the mean value of the output signal u5 is brought to the desired operating point ur2.

To compensate for the tolerances of the feedback resistors R1, R2, a third switch or inverting device 330 is inserted in the signal path following these two feedback resistors. Thus, after the feedback resistors, the third inverting device 330 converts a sensor signal u6 to a sensor signal u7 which is then output from the converter. In the amplifying stage 200 thus described, u7 is identical to the input signal u1.

An essential block of the overall sensor circuit is the sensor system 100, which is shown as a switchable Hall sensor system in this embodiment, although other sensor systems are contemplated. A magnetic field applied across a current carrying material, i.e., a conductor, will force the moving carriers to one side of the conductor or plate. An electric field is developed because of this crowding. The Hall effect is developed when the conductor is positioned so that the magnetic field is perpendicular to the direction of current flow and the magnetic field is perpendicular to both. In other words, where the current density or flow is carried by a conductor in the x direction, and a magnetic field is applied across the conductor in the y direction, a Hall voltage is developed in the z direction.

In FIG. 1, the square Hall plates depicted are intended to symbolize a single Hall plate or a plurality of Hall plates connected in parallel. When a plurality of parallel-connected Hall plates are used, accuracy can be increased and the resulting offset error can be reduced by using an orientation and respective current directions that are different. Such a "crystal lattice" also reduces direction-dependent influences. The schematic representation of the Hall plate 110 has an input terminal for the Hall supply current ih and an opposite output terminal which is grounded through a fourth inverting device 340. The two measuring terminals of the Hall plate 110, like the two current terminals, are connected to a four wire distribution network 120, which is coupled through the first and third inverting devices 310, 330 to the amplifying stage 200 and through the fourth switch or inverting device 340 to the supply unit 400.

In the Hall sensor system shown schematically in FIG. 1, the inverting device 340 causes the current direction in the Hall plates 110, 130 to be changed by 90 degrees. By further switching means, the feed-in points of the Hall plate 110 can be interchanged in an arbitrary manner; the taps for the Hall voltages can be interchanged correspondingly. The change in current direction by 90 degrees is particularly advantageous because the resulting offset errors of the Hall plate 110 add to the Hall voltage in one current direction while being subtracted from the Hall voltage in the current direction rotated by 90 degrees. If the associated taps of the Hall voltage are properly chosen, the desired sensor signal with the desired phase position will be available for the input signal u1. Under certain circumstances, for example, if the current direction in the sensors is changed by 180°, this eliminates the need for the first inverting device 310. Cyclically changing the direction of the Hall current ih in steps through 360 degrees will improve the symmetry of the Hall voltage measurement without appreciably increasing the complexity of the circuit.

However, the output signal u5, and the preceding signal u4, must not undergo the phase reversal of the sensor system. The polarity of the output signal u5 is defined by a reference polarity which is determined by the respective sensor system 100 and the physical quantity to be measured. In the case of a Hall sensor, for example, the current flow perpendicular to the Hall plate 110 defines the reference direction of the magnetic field and thus, the reference polarity for the output signal u5. If the external magnetic field changes in polarity, the polarity of the output signal u5 will change because of the fixed relationship between the magnetic field and the reference voltage or current polarity. If the Hall sensor system is designed as a differential system, a further Hall plate system 130, which is as identical in design to the Hall plate system 110 as possible, can be connected via the distribution network 120. The two Hall plate systems are advantageously connected in inverse parallel with respect to the output voltages, because then only the difference in value of the two Hall voltages needs to be amplified as the measuring voltage u1.

Thus, in the sensor circuit described with reference to FIG. 1, the essential offset errors can be eliminated by signal inversion and averaging. An exception is the offset error of the combiner stage 240, whose input signal u4 always has the same polarity. However, the contribution of this stage to the offset error is small and inversely proportional to the gain of the input amplifier 220. For example, if the input gain is 50 dB, the offset error of the combiner stage 240 will enter into the output signal u5 with only −50 dB. With the circuit of FIG. 1, a Hall sensitivity of 40 mV/mT, referred to the output signal u5, can be achieved.

The use of transconductance amplifiers enhances the linearity of the circuit, because all transconductance amplifiers are operated at virtual zero at the input end, so that nonlinearities due to voltage differences cannot occur. The feedback current flowing through the resistors R1, R2 compensates for the respective Hall voltage uh within the Hall plate system 110, 130; this way, this voltage will only have the value zero at the output terminals, regardless of the magnitude of the magnetic field to be measured. In this manner, any residual errors of the offset compensation (with 90° changes in current direction and a voltage being fed into the Hall plate) are largely eliminated already within the Hall plate.

The invention is particularly suitable for a Hall sensor system which is integrated with the associated evaluating circuit on a single chip. The low sensitivity of the integrated Hall plates is compensated by increased gain, and the Hall plates can be controlled by thermal coupling on the chip in such a way as to achieve an arbitrary temperature response. Thus, arbitrarily "intelligent"sensor circuits can be fabricated on the chip using complex evaluating devices and auxiliary circuits.

A further improvement will be achieved if the current direction in the Hall sensor system can be changed. Changing the current direction, on the one hand, permits the necessary signal reversal for the amplifying stage; on the other hand, this makes it possible to suppress manufacturing and stress-induced offset errors of the Hall plates. Through the change in current direction, the offset errors appear with positive and negative signs, so that they cancel each other out during averaging, while the Hall voltages add together if the current direction in the signal path is changed in a suitable manner. Switchable Hall sensors with which the offset errors of the Hall plates can be eliminated are described, for example, in European Patent 0 548 391 A1, entitled OFFSET-COMPENSATED HALL SENSOR, by S. Mehrgardt et al., published on Jun. 30, 1993, and assigned to Deutsche ITT Industries GmbH, the assignee herein. See also U.S. Pat. No. 5,604,433, entitled OFFSET COMPENSATION FOR MAGNETIC-FIELD SENSOR WITH HALL EFFECT DEVICE, issued on Feb. 18, 1997, to Ulrich THEUS and Mario MOTZ, the inventors herein, and also assigned to Deutsche ITT Industries GmbH, the assignee herein.

Further, by a symmetrical design of the signal path and the associated circuit elements, for example, by all-differential-signal processing, the monolithic integrated sensor circuit becomes highly insensitive to interfering radiation, because the latter appears essentially as common-mode signals, which are either compensated for or have no effect because of the circuit symmetry. The effects of other common-mode error sources are also suppressed, such as dynamic offset errors caused by the switching devices, nonlinearities of the switching devices and feedback resistors, and common-mode errors of the individual amplifier stages. With the regulating circuits, the operating point of the symmetrical signal path can be maintained at a predetermined voltage level, e.g., at 2.5 V in the case of the 5-V supply in CMOS circuits. This middle operating point also makes it possible to measure positive and negative sensor signals, whereby the dynamic range is doubled.

An averaging combiner stage also may be located outside the amplifying stage 200 and be supplied with a sensor signal reversed in polarity of equal time intervals; the inversion must then be linked with this combiner stage. This is readily possible, for example, if the amplified sensor signal is previously digitized and then added to or subtracted from a stored sensor value by means of an adder/subtractor. In that case, the averaging will better be performed with a digital filter, because such a filter averages over several stored values, whereby the signal waveform is improved. A simple analog implementation of external averaging uses an external low-pass filter which is formed in the simplest case by an external RC section, a first-order low-pass filter.

It will be understood that the embodiments described herein are merely exemplary and that a person skilled in the art may make variations and modifications without departing from spirit and scope of the invention. For example, the sensor system may advantageously be designed as a differential sensor system. In that case, the output signals of two separate on-chip sensor systems would be combined by addition or subtraction according to polarity using, for example, an inverse parallel configuration, and then they would be applied jointly to the amplifying stage. Also, the invention has been illustrated with a Hall sensor system, but other sensor systems are contemplated. All such variations and modifications are intended to be included within the scope of the appended claims.

We claim:

1. A monolithic integrated sensor circuit comprising:
   a sensor system for generating a sensor signal;
   a supply unit for generating current for the sensor system;
   an amplifying stage for amplifying the sensor signal generated by the sensor system;
      wherein the amplifying stage comprises an input amplifier and an output stage amplifier, and wherein the output stage amplifier receives an amplified sensor signal and produces an output signal having a reference polarity which is controlled by a plurality of inverting means; and
      the plurality of inverting means for periodically reversing the polarity of the sensor signal at equal time intervals coupled to a signal path of the amplifying stage, with one of said plurality of inverting means being connected between the input amplifier and the output stage amplifier.

2. The monolithic integrated sensor circuit of claim 1, wherein the plurality of inverting means reverse the polarity of the sensor signal by means of a switching clock from a clock signal source.

3. The monolithic integrated sensor circuit of claim 2, wherein the plurality of inverting means control the reference polarity of the sensor signal in such a way as to be always the same regardless of a switching state in the signal path.

4. The monolithic integrated sensor circuit of claim 3, wherein the sensor system comprises a differential-sensor system.

5. The monolithic integrated sensor of claim 1, wherein the output stage amplifier exhibits low-pass characteristics, has capacitive feedback, and performs the function of an averaging combiner stage.

6. The monolithic integrated sensor circuit of claim 3, wherein the sensor system comprises a Hall sensor system with a Hall plate coupled to the input amplifier of the amplifying stage.

7. The monolithic integrated sensor circuit of claim 6, further comprising a plurality of Hall plates connected in parallel.

8. The monolithic integrated sensor circuit of claim 7, wherein the current direction and voltage measurement direction in the Hall sensor system can be changed by integral multiples of approximately 90° relative to a direction predetermined by the Hall sensor system.

9. The monolithic integrated sensor circuit of claim 6, wherein the amplifying stage further comprises a regulating circuit which stabilizes an operating point of a symmetrical signal path at a predetermined voltage level.

10. The monolithic integrated sensor circuit of claim 6, wherein the amplifying stage is a feedback operational amplifier arrangement having two feedback resistors coupled to the inputs of the input amplifier, and wherein an input resistance of the amplifying stage is formed by an internal resistance of the Hall plate connected thereto, and wherein the feedback resistors are formed from the same semiconductor material as the Hall plate.

11. The monolithic integrated sensor circuit of claim 10, wherein the output stage amplifier functions as an averaging combiner stage and comprises a transconductance amplifier.

12. The monolithic integrated sensor circuit of claim 11, wherein the clock signal source generates a first switching clock, a second switching clock whose time intervals are of the same length as the time intervals of the first switching clock, and a third switching clock having a signal that corresponds to non-overlapping portions of the first and second switching clocks, and wherein the resulting time constant is equal to or greater than the non-overlapping portion of the signal generated by the third switching clock.

13. The monolithic integrated sensor circuit of claim 3, wherein a sensor path is substantially symmetrical.

14. A monolithic integrated sensor circuit comprising:
   a sensor system for generating a sensor signal;
   a supply unit for generating current for the sensor system, the supply unit being coupled to a remainder of the monolithic integrated sensor circuit and defining a reference current polarity for biasing the sensor system;
   an amplifying stage for amplifying the sensor signal generated by the sensor system, the amplifying stage being defined by an input amplifier and an output amplifier, wherein the input amplifier is coupled to the sensor system for receiving the sensor signal, and the output amplifier receives an amplified sensor signal from the input amplifier and functions as an averaging combiner stage;

at least three inverting means for periodically reversing the polarity of the sensor signal at equal time intervals coupled to a signal path of the amplifying stage, with one inverting means being coupled between the input and output amplifiers; and a clock signal source coupled to the at least three inverting means which generates a first switching clock and a second switching clock, wherein the first and second switching clocks have equal time intervals and control a signal through the at least three inverting means, wherein the first switching clock causes the signal to be switched through the at least three inverting means directly and the second switching clock causes cross-switching of the signal path so that the offset error of the amplifying amplifier stage is averaged out.

15. The monolithic integrated sensor circuit of claim 14, further comprising a third switching clock generated by the clock signal source, wherein the third switching clock has a signal that corresponds to non-overlapping portions of the first and second switching clocks, and wherein the output amplifier is a transconductance amplifier having capacitive feedback, with a resulting time constant being at least as great as the non-overlapping portion of the signal generated by the third switching clock.

16. The monolithic integrated sensor circuit of claim 15, further comprising a short-circuiting switch inserted between the input amplifier and output amplifier for preventing spurious external signals from being caught by open interfaces during the time interval generated by the third switching clock.

17. The monolithic integrated sensor circuit of claim 14, wherein the sensor system comprises a Hall sensor system having a plurality of parallel-connected Hall plates.

18. A monolithic integrated sensor circuit comprising:

a sensor system for generating a sensor signal;

a supply unit for generating current for the sensor system, the supply unit being coupled to a remainder of the monolithic integrated sensor circuit and defining a reference current polarity for biasing the sensor system;

an amplifying stage for amplifying the sensor signal generated by the sensor system, the amplifying stage being defined by an input amplifier and an output amplifier, wherein the input amplifier is coupled to the sensor system for receiving the sensor signal, and the output amplifier receives an amplified sensor signal from the input amplifier and functions as an averaging combiner stage;

at least three inverting means for periodically reversing the polarity of the sensor signal at equal time intervals coupled to a signal path of the amplifying stage, with one inverting means being coupled between the input and output amplifiers;

a clock signal source coupled to the at least three inverting means which generates a first switching clock and a second switching clock, wherein the first and second switching clocks have equal time intervals and control a signal through the at least three inverting means, wherein the first switching clock causes the signal to be switched through the at least three inverting means directly and the second switching clock causes cross-switching of the signal path so that the offset error of the amplifying stage is averaged out; and two feedback resistors coupled to the output amplifier for feeding the output signal generated from the output amplifier back to the sensor system, wherein the two feedback resistors are also coupled to the input amplifier via two of said at least three inverting means.

19. The monolithic integrated sensor circuit of claim 18, further comprising a first and second regulating circuit, wherein the first regulating circuit regulates an operating point of the input amplifier applying the reference current generated by the supply unit, and the second regulating circuit regulates an operating point of the output amplifier also by applying the reference current generated by the supply unit.

20. The monolithic integrated sensor circuit of claim 18, wherein said at least three inverting means comprising a first inverting means is located directly between the sensor system and the input amplifier; a second inverting means is located between the input amplifier and the output amplifier; a third inverting means is located along the signal path following the two feedback resistors; and a fourth inverting means is connected to the supply unit.

* * * * *